United States Patent
Singh et al.

(10) Patent No.: US 12,238,075 B2
(45) Date of Patent: *Feb. 25, 2025

(54) MESSAGING BASED ON TRUST LEVELS AND RESOURCE LIMITATIONS IN A MESH NETWORK (71) Applicant: ITRON, INC., Liberty Lake, WA (US)

(72) Inventors: Kalvinder Pal Singh, Miami (AU); Darin Byron Johnson, San Jose, CA (US); Zoltan Peter Kiss, Los Altos, CA (US)

(73) Assignee: ITRON, INC., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,247

(22) Filed: Jul. 10, 2023

(65) Prior Publication Data
US 2023/0362143 A1 Nov. 9, 2023

Related U.S. Application Data (63) Continuation of application No. 17/125,701, filed on Dec. 17, 2020, now Pat. No. 11,736,451.

(51) Int. Cl.
H04L 9/40 (2022.01)
H04L 9/08 (2006.01)
(Continued)

(52) U.S. Cl.
CPC ........ H04L 63/0428 (2013.01); H04L 9/0894 (2013.01); H04L 12/18 (2013.01);
(Continued)

(58) Field of Classification Search
CPC ... H04L 63/0428; H04L 9/0894; H04L 12/18; H04L 67/12; H04L 63/0435;
(Continued)

(56) References Cited

U.S. PATENT DOCUMENTS 8,775,791 B2 * 7/2014 Taylor ................. H04L 63/0442
713/153
2006/0063594 A1 * 3/2006 Benbrahim ......... G07F 17/3223
463/42

(Continued)

FOREIGN PATENT DOCUMENTS

EP 3 192 229 A1 7/2017
WO 2016/040565 A1 3/2016

OTHER PUBLICATIONS

Aikebaier et al., "Reliable And Efficient Way to Broadcast Messages in Group by Trust-Based Broadcast (TBB) Scheme", Computing and Informatics, vol. 30, 2011, pp. 1067-1081.

(Continued)

Primary Examiner — Henry Tsang
(74) Attorney, Agent, or Firm — Artegis Law Group, LLP (57) ABSTRACT Techniques for messaging based on trust levels and resource limitations in a mesh network include receiving, by a first node of a mesh network, a message; determining, by the first node, a security key type based on a resource parameter associated with a neighbor node included in the mesh network; securing, by the first node, the message using a security key of the security key type; and transmitting, by the first node, the secured message to the neighbor node. The resource parameter associated with the neighbor node comprises at least one of an amount of memory used to decrypt the secured message at the neighbor node, an amount of power used to decrypt the secured message at the neighbor node, or an indication of an amount of power remaining at the neighbor node.

20 Claims, 4 Drawing Sheets (51) Int. Cl.
*H04L 12/18* (2006.01)
*H04L 67/12* (2022.01)

(52) U.S. Cl.
CPC .......... *H04L 67/12* (2013.01); *H04L 63/0435* (2013.01); *H04L 63/0442* (2013.01)

(58) Field of Classification Search
CPC ..... H04L 63/0442; H04L 9/088; H04L 63/06; H04L 63/20; H04L 67/04; H04W 12/009; H04W 12/66
See application file for complete search history.

(56) References Cited

U.S. PATENT DOCUMENTS

| | | | | |
|---|---|---|---|---|
| 2008/0155644 | A1* | 6/2008 | Baranov | H04W 12/108 726/1 |
| 2015/0245202 | A1* | 8/2015 | Patil | H04W 12/06 380/279 |
| 2015/0351084 | A1 | 12/2015 | Werb | |
| 2018/0006812 | A1* | 1/2018 | Oberheide | H04L 9/0897 |
| 2020/0029209 | A1* | 1/2020 | Nölscher | H04W 12/069 |
| 2020/0084620 | A1* | 3/2020 | Jana | H04L 9/0869 |
| 2020/0127821 | A1 | 4/2020 | Dolev et al. | |

OTHER PUBLICATIONS

Kerrache et al., "RITA: Risk-Aware Trust-Based Architecture for Collaborative Multi-Hop Vehicular Communications", Security And Communication Networks, DOI: 10.1002/sec.1618, 2016, 15 pages.

Galaviz-Mosqueda et al., "Multi-Hop Broadcast Message Dissemination in Vehicular Ad Hoc Networks: A Security Perspective Review", International journal of Distributed Sensor Networks, DOI: 10.117711550147717741263, vol. 13 (11), Feb. 27, 2017, pp. 1-22.

* cited by examiner

MESSAGING BASED ON TRUST LEVELS AND RESOURCE LIMITATIONS IN A MESH NETWORK

CROSS-REFERENCE TO RELATED APPLICATIONS

The present application is a continuation of United States application titled "MESSAGE BROADCASTING BASED ON TRUST LEVELS AND RESOURCE LIMITATIONS IN A MESH NETWORK," filed on Dec. 17, 2020, and having Ser. No. 17/125,701. The subject matter of this related application is hereby incorporated herein by reference.

FIELD OF THE VARIOUS EMBODIMENTS

The present invention relates generally to computer science and network communications and, more specifically, to messaging based on trust levels and resource limitations in a mesh network.

DESCRIPTION OF THE RELATED ART

A mesh network typically includes multiple electronic devices (referred to herein as "nodes") that are organized in a mesh topology and connect to one another either directly or indirectly in a dynamic, non-hierarchical fashion. In a mesh network, the nodes cooperate with one another to route data to and from the different nodes within the network as well as to and from devices outside the network. Mesh networks are becoming increasingly common in a wide variety of applications, including, and without limitation, home security and home automation systems, home network systems, smart grid systems, and other "Internet-of-Things" systems.

As with any network, security can be an important consideration when configuring and operating a mesh network. For example, without having sufficient security protocols in place, a mesh network can be disabled for an extended period of time simply by broadcasting an insecure packet within the network that winds up propagating throughout the network to most or all nodes. One issue with mesh networks, though, is that many mesh networks include a heterogeneous collection of electronic devices that can vary greatly in computational and power resources. For example, some nodes within a mesh network may be configured with significant processing capabilities and wired power sources and, accordingly, be considered high-resource devices. By contrast, low-resource devices, such as remote sensors, may be configured with limited processing capabilities and may be powered using only batteries. Because such differences can exist with a mesh network, the various capabilities and characteristics of the devices and channels within the network are relevant to overall network security. Network security for many conventional mesh networks, however, is based only on the capabilities and characteristics of the devices in the networks having the lowest levels of functionality. Such approaches can decrease the overall level of network security.

In an effort to combat security vulnerabilities, some conventional mesh networks implement cryptographic techniques to encrypt and/or authenticate the messages transmitted between nodes within those networks. For example, mesh networks may be configured with asymmetric (public-key) or symmetric cryptosystems. One drawback to employing symmetric or asymmetric cryptosystems in a mesh network is that substantial computational and power resources are required to perform the associated cryptographic algorithms at each node, which can adversely affect overall operation of the mesh network. For example, when a mesh network that includes both high-resource and low-resource devices uses asymmetric cryptographic algorithms between nodes, the limited computing power of the low-resource devices can result in substantial delays in sending messages. Such delays can be problematic in "real-time" mesh networks. Further, executing the cryptographic algorithms of symmetric and asymmetric cryptosystems can quickly deplete the limited power resources of the battery-powered nodes within a mesh network. Consequently, when sensitive messages are broadcast to low-resource devices within mesh networks that implement these cryptographic techniques, the networks can experience performance issues resulting from authenticating and/or encrypting messages at the low-resource devices and/or can experience dropped secured messages at the low-resource devices, which can decrease overall network functionality.

As the foregoing illustrates, what is needed in the art are more effective techniques for broadcasting messages securely within a mesh network.

SUMMARY

One embodiment of the present application sets forth a computer-implemented method for transmitting messages within a mesh network comprises: receiving at a first node included within the mesh network a network message that is to be broadcast within the mesh network; determining a security key type based on at least one of a resource parameter associated with at least one neighbor node included in the mesh network or an attribute of the network message; securing the network message with a security key of the security key type to generate a secured network message; and broadcasting the secured network message to one or more other nodes included in the mesh network that are directly connected to the first node.

At least one technical advantage of the disclosed techniques relative to the prior art is that the disclosed techniques enable a specific node within a mesh network to select a security key type that is based on the computing and power capabilities of that specific node when securing a network message for transmission within the network. Accordingly, with the disclosed techniques, encrypting and/or authenticating the network message, and therefore the security of the network message, is tailored to be compatible with the resources of the sending and/or receiving nodes. Another technical advantage is that the battery consumption caused by low-resource nodes executing asymmetric and symmetric encryption and authentication algorithms and the message latency associated with such nodes executing asymmetric encryption and authentication is avoided without reducing the security of broadcast messages sent to other nodes in the mesh network. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
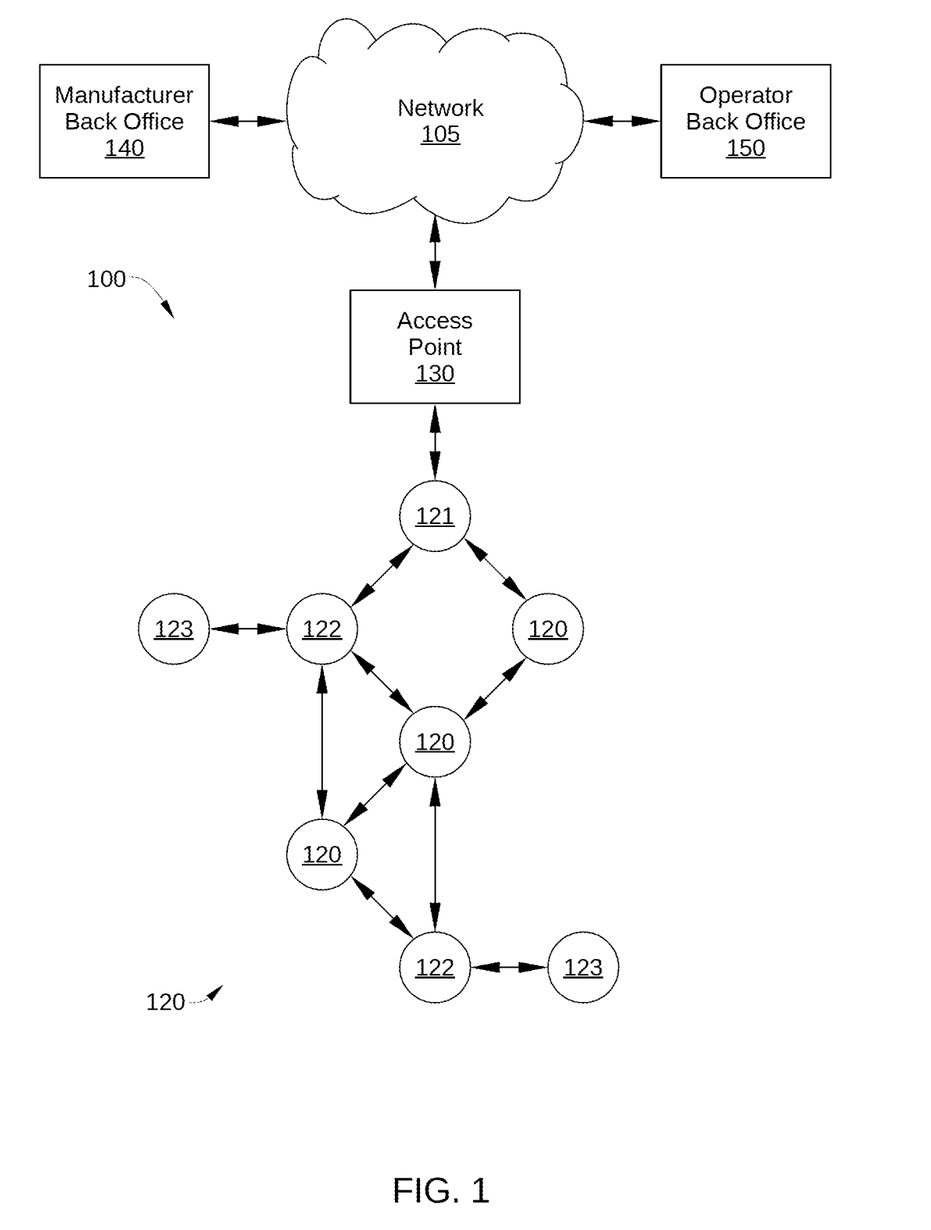
FIG. 1 is a conceptual illustration of a mesh network configured to implement one or more aspects of the various embodiments.

FIG. 1 is a conceptual illustration of a mesh network 100 configured to implement one or more aspects of the present disclosure. Mesh network 100 includes a plurality of electronic devices (referred to herein as "nodes") 120, which are organized in a mesh topology. Mesh network 100 has decentralized node associations, and generally does not include a central server or management entity to dictate the mesh-network topology. Instead, nodes 120 of mesh network 100 communicate with each other via zero, one, or more intermediate electronic devices or nodes. In operation, each node 120 communicates with one or more communicatively adjacent nodes, referred to herein as neighboring node(s). In some embodiments, neighboring nodes are nodes that are directly connected to each communicatively (via a wired or wireless connection) without an intervening node of the mesh network. Frequently, communication between two nodes 120 in mesh network 100 is via one or more intermediate nodes 120, and is referred to as "one-hop" communication, "two-hop" communication, etc.

In the embodiment illustrated in FIG. 1, mesh network 100 is communicatively coupled to one or more external networks 105 outside mesh network 100, such as the Internet. For example, in some embodiments, mesh network 100 is communicatively coupled to external network 105 via a gateway node 121 (also referred to as a border router or an edge router). In some embodiments, mesh network 100 further includes one or more leaf nodes 123 that are each associated with and/or included in an electronic device, but are not configured to actively route traffic to other nodes 120. Thus, a leaf node 123 and the associated electronic device can communicate via mesh network 100, but generally do not include the capability to route traffic in mesh network 100 beyond forwarding to the adjacent node 120, such as a parent router 122. For example, in some embodiments, one type of electronic device associated with a leaf node 123 is a battery-powered sensor.

Gateway node 121 includes a second interface for communication with external network 105. Gateway node 121 is configured to connect to an access point 130 over external network 105. For example, in some embodiments, access point 130 may be an Ethernet router, a Wi-Fi access point, or any other suitable device for bridging different types of networks. Access point 130 connects to external network 105, and enables communication between nodes 120 of mesh network 100 and one or more cloud services coupled to external network 105, such as a manufacturer back office 140 and/or an operator back office 150.

Manufacturer back office 140 is associated with a particular manufacturer of one or more electronic devices included in nodes 120, and is configured to provide one or more services to and otherwise communicate with such electronic devices via mesh network 100. For example, in some embodiments, manufacturer back office 140 communicates periodically with such nodes 120 to setup the electronic devices of the nodes 120, send hardware-specific notifications, poll for errors, provide firmware updates, and/or issue specific commands. In some embodiment, manufacturer back office 140 is a source of manufacturer credentials for nodes 120. In the embodiment illustrated in FIG. 1, a single manufacturer back office 140 is communicatively coupled to mesh network 100. In other embodiments, multiple manufacturer back offices 140 may be communicatively coupled to mesh network 100, for example when a first group of the electronic devices of nodes 120 is manufactured by one manufacturer and a second group of the electronic devices of nodes 120 is manufactured by another manufacturer.

Operator back office 150 is associated with a particular user of mesh network 100, and is configured to communicate with and/or control nodes 120 via mesh network 100. For example, in some embodiments, mesh network 100 is a smart-grid or other digitized utility network, and operator back office 150 is associated with the utility that operates mesh network 100. In such embodiments, mesh network 100 facilitates the reporting of energy, gas, water, and/or reverse-energy readings from and the sending of notifications to the various meters and other electronic devices coupled to nodes 120. In some embodiment, operator back office 150 is a source of customer-level or operator-level credentials for nodes 120.

Alternatively or additionally, other cloud services (not shown) may be coupled to external network 105 and provide services related to and/or using the devices within the mesh network 100. For example, in some embodiments such services may include connecting end-user devices (e.g., smart phones, electronic tablets, computers, etc.) to the electronic devices of nodes 120, receiving, processing, and/or providing data acquired in mesh network 100 to end users, provisioning and/or updating the electronic devices of nodes 120, and the like.

Nodes 120 can include a mixture of battery-powered nodes, alternating current (AC) powered nodes, nodes that are AC-powered with battery backups, and/or nodes that are AC-powered with uninterruptible power supplies. Further, in some embodiments, some or all of mesh network 100 is implemented as a wireless mesh network (WMN). In such embodiments, electronic devices of nodes 120 are capable of wirelessly communicating with other electronic devices. Such electronic devices may include a network interface for a cellular network (UMTS, LTE, etc.), a wireless local area network (described in the Institute of Electrical and Electronics Engineers (IEEE) 802.11 standard or Bluetooth from the Bluetooth Special Interest Group of Kirkland, Wash.), and/or another type of wireless network. Alternatively or additionally, in some embodiments, the connections between nodes 120 mesh network 100 can include wired connections. In light of the above, communication and/or data transfer in mesh network 100 cam be implemented via any technically feasible wired or wireless method or protocol, including, for example, an Ethernet network, a public switched telephone network (PSTN), a power line network, a local area network (LAN), a wireless local area network (WLAN), Bluetooth, Z-Wave, ZigBee, INSTEON, local wireless 900 MHz communication band, 6LoWPAN, and the like.

Figure 2:
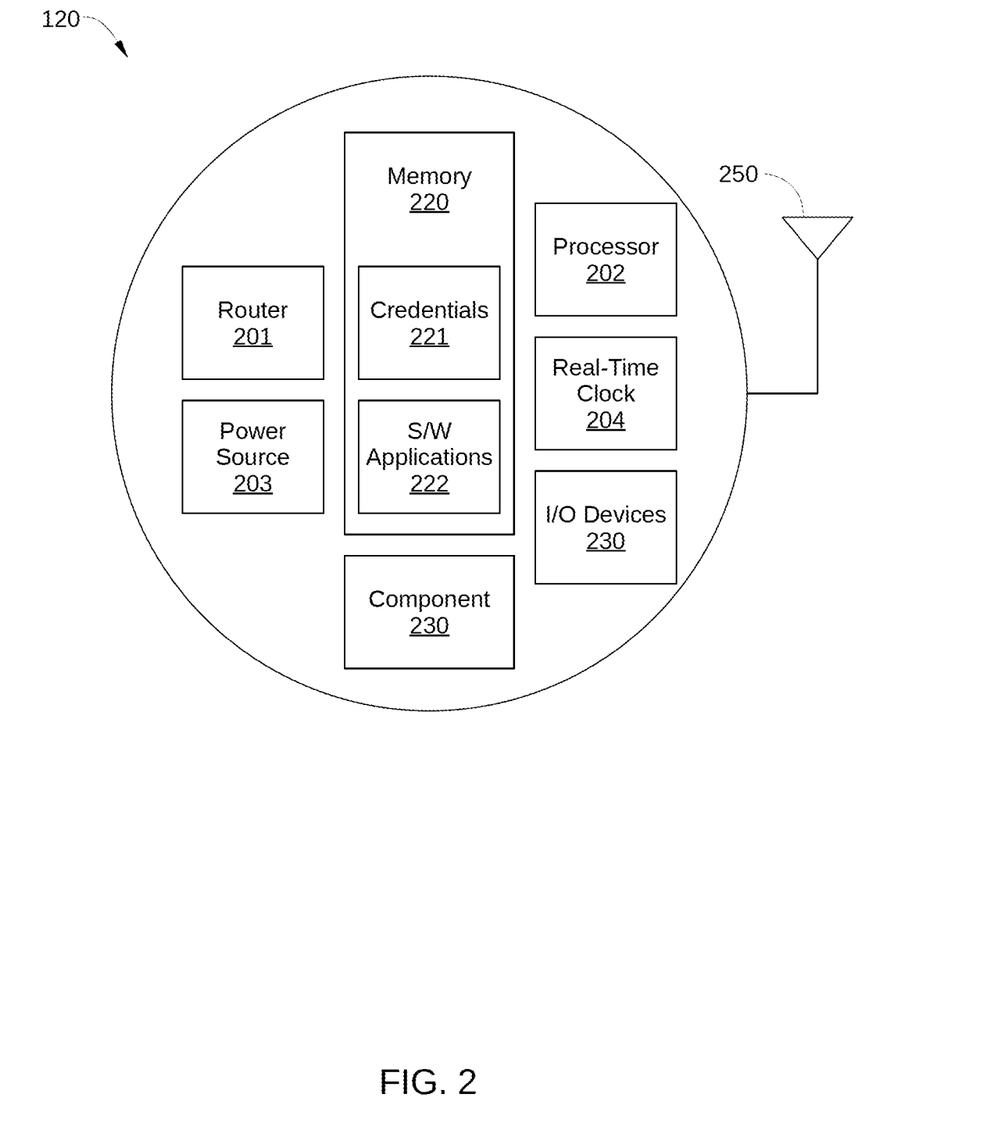
FIG. 2 is a more detailed illustration of a node of the mesh network of FIG. 1, according to various embodiments.

FIG. 2 is a more detailed illustration of a node 120 of mesh network 100, according to various embodiments. In the embodiment illustrated in FIG. 2, node 120 includes a router 201, a processor 202, a power source 203, a memory 220, a component 230, I/O devices 240, a transceiver 250, and, in some embodiments, a real-time clock 204.

Router 201 enables routing of messages to and from adjacent nodes 120 of mesh network 100. In operation, router 201 employs credentials 221 (stored in memory 220) to authenticate the identity of adjacent nodes 120 as a member of mesh network 100. Further, router 201, in conjunction with processor 202, employs credentials 221 to encrypt, decrypt, and/or authenticate communications in mesh network 100 as described herein.

Processor 202 may be any technically feasible hardware unit capable of processing data and/or executing instructions associated with the operation of node 120 and/or the component 230 associated with node 120. Power source 203 may include one or more of an AC power source, a battery power source, an AC power source with a battery backup, an AC power source with an external uninterruptible power supply, or any other power source or combination of power sources.

In various embodiments, processor 202 can generate one or more encryption/decryption/authentication keys for communications with neighbor node devices of node device 120. For each neighbor node device, processor 202 can generate a key for messages to be sent by the neighbor node device to node device 120. Node device 120 can send to the neighbor node device the key generated for the neighbor node device by processor 202, and can receive a key generated by the neighbor node device. Node device 120 can send secured (e.g., encrypted and/or authenticated) messages to the neighbor node device using the key received from the neighbor node device. The neighbor node device can send secured messages to node device 120 using the key generated by processor 220, processor 220 can authenticate and/or decrypt the messages using that key or a corresponding asymmetric key. Processor 220 can generate keys in accordance with instructions programmed in hardware (e.g., programmed into the processor 220) and/or software (e.g., in a software application 242). Node device 210 can store keys generated by processor 220 and keys received from neighbor node devices in memory 240 (e.g., in key store 246).

Memory 220 may include any technically feasible memory device or devices configured to store instructions for the operation of node 120 and/or credentials 221. Thus, memory 220 may include one or more of a random access memory (RAM) module, a flash memory unit, a hard disk drive, or any other type of memory unit or combination thereof. Generally, memory 220 includes at least one persistent memory device capable of storing credentials 221 when node 120 is powered off. Real-time clock 204 may include any technically feasible device configured to provide accurate time, such as a time value traceable to Coordinated Universal Time (UTC).

Memory 220 includes one or more software applications 222. The one or more software applications 222 include program code that, when executed by processor 202, may perform any of the node-oriented computing functionality described herein. The one or more software applications 222 may also interface with transceiver 250 to coordinate the transmission and/or reception of data packets and/or other messages across mesh network 100. In various embodiments, memory 220 may be configured to store protocols used in communication modes, equations and/or algorithms for identifying metric values, constants, data rate information, and other data used in identifying metric values, etc. Memory 220 can also include a key store where keys for authentication, encryption, and/or decryption of communications (e.g., messages) between node devices can be stored.

In operation, software applications 222 can implement various techniques to optimize communications with one or more linked node devices 120, such as neighboring node devices. In various embodiments, node device 120 is configured to transmit data messages to the linked node device and/or receive data messages from the linked node device by selecting a common communication mode from a plurality of different communication modes that is supported by node device 120 and the linked node device. More generally, node device 120 can be configured for multi-mode communications. Node device 120 can communicate with a linked node, manufacturer back office 140, and/or operator back office 150 using any of a plurality of modes. The particular mode used for a given transmission depends on the particular circumstances of the transmission (e.g., the type of data message, the intended recipients of the data message, etc.). Examples of such communication modes include, without limitation, unicast, broadcast, and multi-cast.

Credentials 221 are used by node 120 to authenticate the identity of neighboring nodes 120 as being a member of the mesh network 100. In addition, in some embodiments, credentials 221 can authenticate a specific trust level of neighboring nodes 120. Thus, in such embodiments, credentials 221 may include credentials for multiple trust levels. For example, in one such embodiment, credentials 221 stored in node 120 may include authentication credentials for a lower trust level (e.g., a manufacturer trust level), authentication credentials for a higher trust level (e.g., a vendor trust level), and authentication credentials for a highest trust level (e.g., a customer or operator trust level). In some embodiments, credentials 221 include one or more symmetric authentication and/or encryption keys and/or one or more asymmetric authentication and/or encryption keys.

In some embodiments, manufacturer trust level authentication credentials are stored in memory 220 at a time of manufacture of node 120 and/or component 230. In some embodiments, vendor trust level authentication credentials are stored in memory 220 after the manufacture of node 120 and/or component 230 but prior to installation of node 120 and/or component 230 in mesh network 100. In some embodiments, customer trust level authentication credentials are stored in memory 220 after node 120 and/or component 230 is included in mesh network 100.

Component 230 is an electronic device that is associated with and/or included in node 120. For example, in an embodiment in which mesh network 100 is a smart-grid or other digitized utility network, component 230 may be one of an electric meter, a street light, a traffic light, an element of an automation network, and the like. In an embodiment in which mesh network 100 is associated with a home monitoring or home automation system, component 230 may be one of a security panel, a door lock, a window lock, a camera, a video camera, a motion sensor, a temperature sensor, a noise sensor, a humidity sensor, or any other monitoring or actuation device (e.g. a switch, control panel, thermostat, sump pump, or other home appliance or utility control device). Thus, in such embodiments, mesh network 100 collects data from, transmits notifications to, and performs operations with a plurality of heterogeneous devices. For example, mesh network 100 may enable load-balancing operations within a digitized utility network or home automation operations within a home automation system using the plurality of heterogeneous devices. Such devices may be battery powered or constantly powered, have high-resource computing capabilities (e.g., a network interface card) or limited computing capabilities (e.g., a battery-powered sensor), have different manufacturers, and/or different dates of manufacture. Thus, the nodes 120 of mesh network 100 can have widely varying computational and power resources available.

I/O devices 230 include devices configured to receive input, devices configured to provide output, and devices configured to both receive input and provide output.

In operation, a node 120 receives messages from and sends messages to neighbor nodes in mesh network 120. Depending on a current trust level of the node from which the message originates, a node 120 (referred to herein as the "sending node") may broadcast the received message to all neighboring nodes, in some instances with instructions to forward the received message to the neighboring nodes of the neighboring nodes. To ensure security in mesh network 100, each message sent by the sending node may be authenticated and/or encrypted. According to various embodiments, a sending node determines an appropriate security key type (e.g., an asymmetric encryption key, a symmetric encryption key, an asymmetric authentication key, or a symmetric encryption key) to employ when sending a broadcast message to multiple neighbor nodes. Specifically, when sending a broadcast message to multiple neighboring nodes, the sending node determines whether to employ an asymmetric security key, a symmetric security key, or no security at all. In the embodiments, the determination is made based on an attribute of the network message, a resource parameter of the node, and/or on a resource parameter of one or more neighboring nodes.

In some embodiments, an attribute of the network message that can affect the determination of security key type is a trust level associated with the network message. For example, in such embodiments, a network message that is received by the sending node may be at a sufficiently high trust level in a hierarchy of possible trust levels that broadcasting of the network message requires a certain level of security. In such embodiments, the certain level of security may correspond to encryption and/or authentication via a symmetric security key that is employed between the sending node and the neighboring node receiving the network message. Alternatively, in such embodiments, the certain level of security may correspond to encryption and/or authentication via an asymmetric cryptographic (e.g., encryption or authentication) key that is employed by the sending node and requires the neighboring node receiving the secured network message to execute an asymmetric cryptographic (e.g., decryption or authentication) algorithm to authenticate or decrypt the secured network message. In either case, according to various embodiments described herein, the sending node authenticates or encrypts the network message with the appropriate security key and sends the secured network message to neighboring nodes that have sufficient computing and/or power resources to authenticate or decrypt the secured network message.

In some embodiments, an attribute of the network message that can affect the determination of security key type is a forwarding status of the network message. For example, in such embodiments, a network message that is received by the sending node may be indicated to be a broadcast message that is to be sent to all neighboring nodes of the sending node and to all neighboring nodes of the neighboring node. A higher level of security is generally assigned to such broadcast network messages. Thus, in such embodiments, the higher level of security may be satisfied by the sending node encrypting or authenticating the network message via a symmetric encryption or authentication key and, in other embodiments, the higher level of security may be satisfied by the sending node encrypting or authenticating the network message via an asymmetric encryption or authentication key. In either case, according to various embodiments described herein, the sending node encrypts and/or authenticates the network message with the appropriate encryption or authentication key and sends the network message to neighboring nodes that have sufficient computing and/or power resources to decrypt or authenticate the secured network message.

In some embodiments, trust levels associated with a particular network message are included in a hierarchy of possible trust levels. For example, in some embodiments, a lowest trust level in such a hierarchy is a manufacturing trust level, a higher trust level in the hierarchy is a vendor trust level, and a highest trust level in the hierarchy is a customer trust level. In some embodiments, for a device to be established at a manufacturing trust level, the device is verified to include manufacturer-generated credentials. In some embodiments, for a device to be established at a vendor trust level, the device is verified to include vendor-generated credentials, and in some embodiments, for a device to be established at a customer trust level, the device is verified to include customer-generated credentials.

In some embodiments, one or more resource parameters of a sending node can affect the determination of security key type employed by the sending node. Examples of such resource parameters of the sending node include a computational cost of encrypting or authenticating the network message at the sending node, an amount of time needed for the sending node to encrypt or authenticate the network message, an amount of memory used to encrypt or authenticate the network message at the sending node, an amount of power used to encrypt or authenticate the network message at the sending node, or an indication of an amount of power remaining at the sending node.

In some embodiments, one or more resource parameters associated with a neighboring node can affect the determination of security key type employed by the sending node. Examples of such resource parameters associated with the neighboring node include a computational cost of decrypting or authenticating the network message at the neighboring node, an amount of time needed for the neighboring node to decrypt or authenticate the network message, an amount of memory used to decrypt or authenticate the network message at the neighboring node, an amount of power used to decrypt or authenticate the network message at the neighboring node, and an indication of an amount of power remaining at the neighboring node. Additionally or alternatively, in some embodiments, such resource parameters of the neighboring node include a number of resource-limited neighboring nodes that are adjacent to the sending node. In such embodiments, the sending node may determine a neighboring node to be a resource-limited node based on a status indicator provided by the neighboring node and/or on information describing the neighboring node that is stored by the sending node, such as current battery life of the neighboring node.

In some embodiments, an indicator of an availability of an asymmetric encryption or authentication key at the sending node can affect the determination of security key type employed by the sending node. Thus, the absence of such an indicator can cause the sending node to employ symmetric encryption or authentication, or no encryption or authentication at all rather than attempting asymmetric encryption or authentication when sending the network message.

Figure 3:
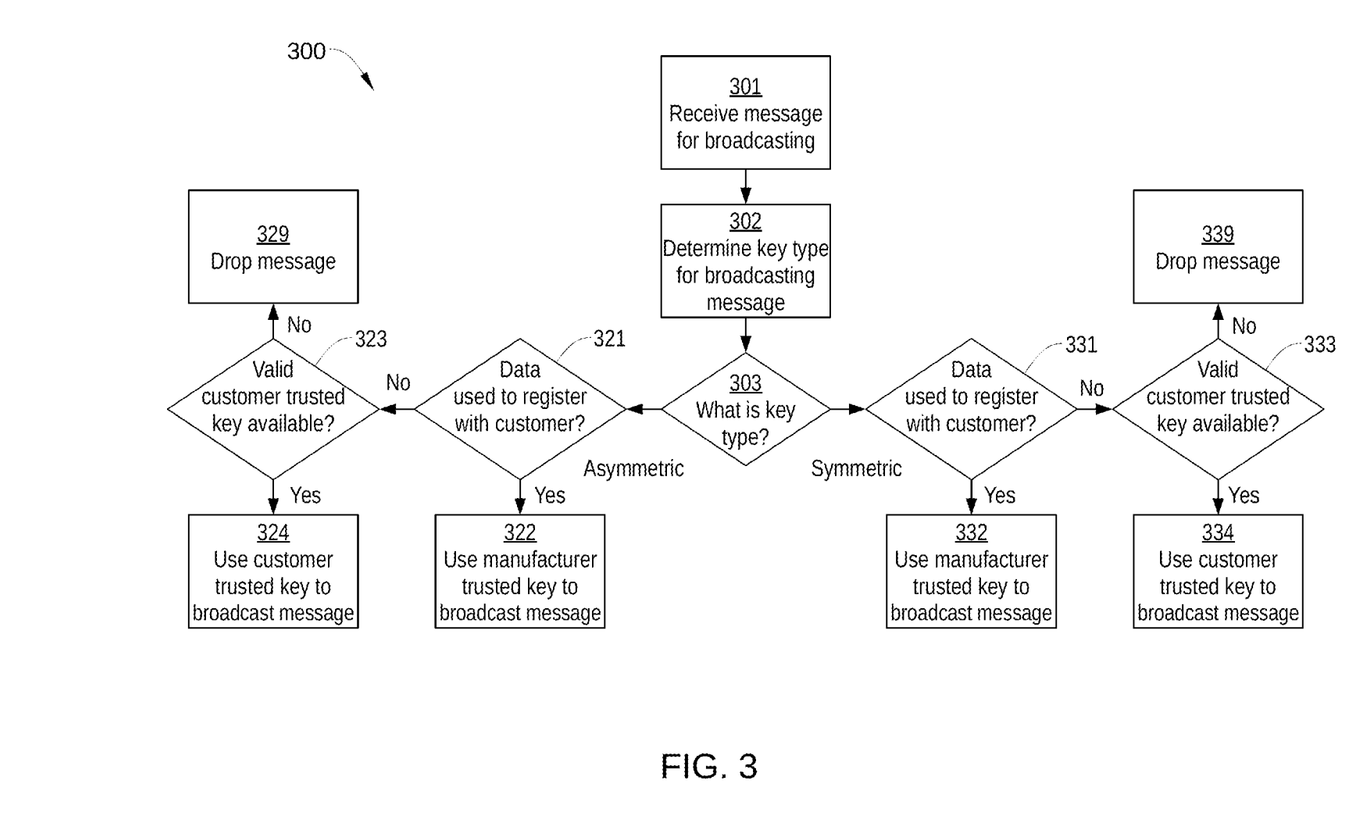
FIG. 3 sets forth a flowchart of method steps for transmitting messages in a mesh network, according to various embodiments.

FIG. 3 sets forth a flowchart of method steps for transmitting messages in a mesh network, according to various embodiments. Although the method steps are described in conjunction with the systems of FIGS. 1 and 2, persons skilled in the art will understand that any system configured to perform the method steps, in any order, is within the scope of the embodiments.

As shown, a method 300 begins at step 301, where a sending node of mesh network 100 receives a network message for broadcasting within mesh network 100. For example, the network message can be a routing message for mesh network 100, a current time broadcast, a message that is associated with a firmware download for a node 120 of mesh network 100, etc. In the embodiment shown in FIG. 3, Method 300 is described in terms of an embodiment of mesh network 100 that operates with two trust levels (e.g., a manufacturer trust level and a customer trust level) and includes customer registration operations (in which a manufacturer trusted key is employed to receive a customer trusted key) and other operations. Embodiments can be implemented in any other technically feasible configuration of mesh network 100.

In step 302, the sending node determines a security key type to be employed by the sending node for broadcasting the network message received in step 301. As described above, the sending node determines the security key type based on one or more factors. In some embodiments, some or all of the factors are parameters of or inputs to an algorithm for generating a determining value. In such embodiments, the algorithm can be a tunable weighting algorithm that can weight each factor individually. Thus, in such embodiments, an instance of the tunable weighting algorithm can be modified during operation of mesh network 100 to generate a different output. Additionally or alternatively, the tunable weighting algorithm can be different in different instances of node 120. Thus, each node 120 can have a different determination process for which security key type is determined in step 302.

One embodiment of a tunable weighting algorithm is shown in Inequaltiy 1, where coefficients A-G are configurable values; $Key_{Asymmetric}$ is a binary value (0 or 1) indicating whether there is an asymmetric key available in the sending node; Data Forward is a binary value (0 or 1) indicating whether the network message is to be forwarded to other nodes; $Memory_{Used}$ is a value indicating a quantity of memory used by the sending node when encrypting and/or authenticating the network message with the asymmetric key; $Cost_{CPU}$ is a value indicating a processing cost for the sending node when encrypting and/or authenticating the network message with the asymmetric key; $Power_{CPU}$ is a value indicating a power cost for the sending node when encrypting and/or authenticating the network message with the asymmetric key; $Power_{Remaining}$ is a value indicating an estimated quantity of power currently remaining for the sending node; and $Neighbors_{Resource-Limited}$ is a number of resource-limited nodes that are adjacent to the first node:

$$A(Key_{Asymmetric})+B(Data_{Forward})+C(Memory_{Used})+D(Cost_{CPU})+E(Power_{CPU})+F(Power_{Remaining})+G(Neighbors_{Resource-Limited}) > H \quad (1)$$

In the embodiment illustrated in Inequality 1, when Inequality 1 is true, i.e., when the left side of the Inequality 1 is greater than a predetermined value H, the sending node employs a symmetric security key, otherwise the sending node employs an asymmetric security key. As shown, in some embodiments, multiple factors can influence a determination of which security key type is employed for sending the network message received in step 301.

The particular factors included in Inequality 1 and the mathematical relationships between the factors are presented herein as an example only, and can be readily modified for a specific configuration of mesh network 100 by one of skill in the art upon reading the disclosure provided herein. Further, in some embodiments, some or all factors affecting the above-described determination of the security key type may be implemented via any other technically feasible approach. For example, in some embodiments, the sending node can implement the effect of one or more factors on the determination to use an asymmetric security key via or more if/then statements or other logic. Thus, implementation of the effect of one or more factors on the determination to use an asymmetric security key is not limited to a value-generating algorithm.

In step 303, proceeds to step 321 when the security key type determined in step 302 is an asymmetric security key and to step 331 when the security key type determined in step 302 is a symmetric security key.

In step 321, the sending node determines whether data in the network message is to be used for registering with a customer, such as operator back office 150, to receive a customer trusted key. If yes, method 300 proceeds to step 322; if no, method 300 proceeds to step 323. In step 322, the sending node uses the asymmetric security key that is a manufacturer trusted key to encrypt and/or authenticate and broadcast the network message.

In step 323, the sending node determines whether a valid customer trusted key that is an asymmetric security key is available to the sending node. If yes, method 300 proceeds to step 324; if no, method 300 proceeds to step 329. In step 324, the sending node uses the asymmetric security key that is a customer trusted key to encrypt and/or authenticate and broadcast the network message. In step 329, the sending node drops the message.

In step 331, the sending node determines whether data in the network message is to be used for registering with a customer, such as operator back office 150, to receive a customer trusted key. If yes, method 300 proceeds to step 332; if no, method 300 proceeds to step 333. In step 332, the sending node uses the symmetric security key that is a manufacturer trusted key to encrypt and/or authenticate and broadcast the network message.

In step 333, the sending node determines whether a valid customer trusted key that is a symmetric security key is available to the sending node. If yes, method 300 proceeds to step 334; if no, method 300 proceeds to step 339. In step 334, the sending node uses the symmetric security key that is a customer trusted key to encrypt and/or authenticate and broadcast the network message. In step 339, the sending node drops the message.

Method 300 can be advantageously implemented in any mesh network, particularly a mesh network that includes heterogeneous nodes and/or Internet of Things (IoT) devices, in which a secure broadcast desired or required.

Figure 4:
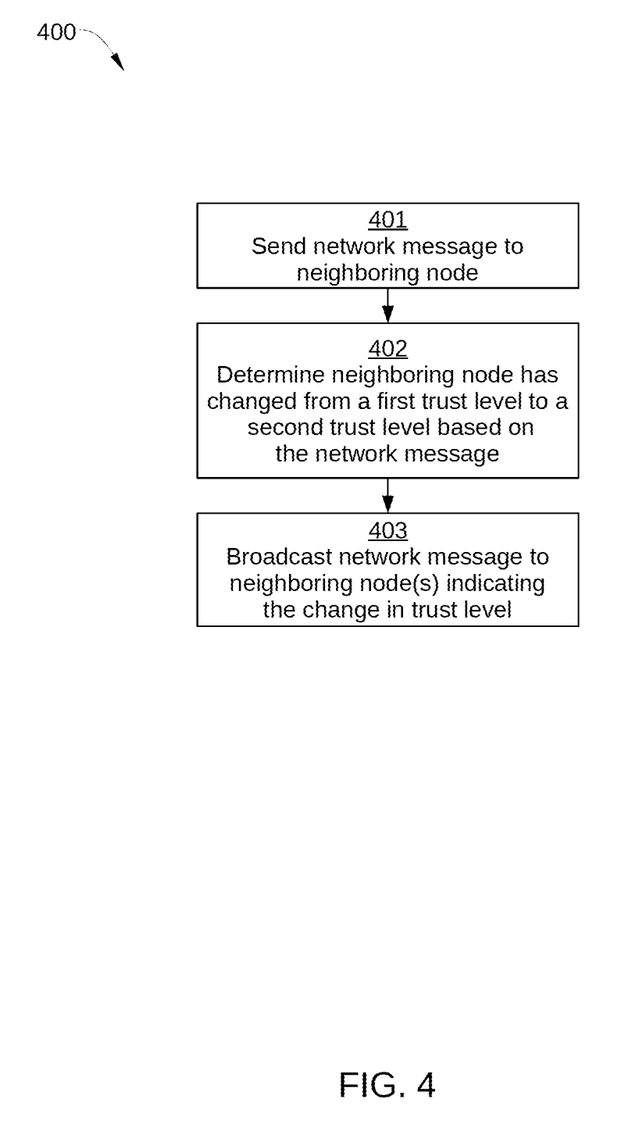
FIG. 4 sets forth a flowchart of method steps for broadcasting a change of trust level in a mesh network, according to various embodiments.

FIG. 4 sets forth a flowchart of method steps for broadcasting a change of trust level in a mesh network, according to various embodiments. Although the method steps are described in conjunction with the systems of FIGS. 1-3, persons skilled in the art will understand that any system configured to perform the method steps, in any order, is within the scope of the embodiments.

As shown, a method 400 begins at step 401, where a sending node of mesh network 100 sends a network message to a neighboring node within mesh network 100. In the embodiments, the network message is associated with a process in which the trust level of the neighboring node in mesh network 100 is changed from a first trust level to a second trust level, where the second trust level is a higher trust level than the first trust level. For example, the network message may be associated with the trust level of the neighboring node changing from a manufacturer trust level to a vendor trust level or a customer trust level. In such an example, the network message may include credentials from operator back office 150.

In step 402, the sending node determines, based at least in part on the network message, that the neighboring node has changed from the first trust level to the second trust level.

In step 403, the sending node broadcasts a network message to one or more other nodes in mesh network 100 indicating that the neighboring node has changed from the first trust level to the second trust level. In some embodiments, the other nodes to which the sending node broadcasts the network message are adjacent to the sending node. Thus, nodes 120 of mesh network 100 can be notified quickly and securely that a particular node in mesh network 100 has changed to a different trust level.

In sum, techniques are provided for transmitting messages in a mesh network. Prior to broadcasting a network message a sending node in a mesh network determines a security key type based on one or more resource parameters of the sending node and/or of a receiving node. In some embodiments, the determination of security key type is further based on one or more attributes of the network message. Once an appropriate security key type is determined, the sending node broadcasts the secured network message to one or more adjacent nodes in the mesh network.

At least one technical advantage of the disclosed techniques relative to the prior art is that the disclosed techniques enable a specific node within a mesh network to select a security key type that is based on the computing and power capabilities of that specific node when securing a network message for transmission within the network. Accordingly, with the disclosed techniques, encrypting and/or authenticating the network message, and therefore the security of the network message, is tailored to be compatible with the resources of the sending and/or receiving nodes. Another technical advantage is that the battery consumption caused by low-resource nodes executing asymmetric and symmetric encryption and authentication algorithms and the message latency associated with such nodes executing asymmetric encryption and authentication is avoided without reducing the security of broadcast messages sent to other nodes in the mesh network. These technical advantages represent one or more technological improvements over prior art approaches.

1. In some embodiments, a computer-implemented method of transmitting messages within a mesh network comprises: receiving at a first node included within the mesh network a network message that is to be broadcast within the mesh network; determining a security key type based on at least one of a resource parameter associated with at least one neighbor node included in the mesh network or an attribute of the network message; securing the network message with a security key of the security key type to generate n secured network message; and broadcasting the secured network message to one or more other nodes included in the mesh network that are directly connected to the first node.

2. The computer-implemented method of clause 1, wherein the security key is stored at the first node.

3. The computer-implemented method of clauses 1 or 2, wherein the security key type is one of an asymmetric encryption key, a symmetric encryption key, an asymmetric authentication key, or a symmetric encryption key.

4. The computer-implemented method of any of clauses 1-3, wherein broadcasting the secured network message to the one or more other nodes included in the mesh network comprises broadcasting the network message to a second node included in the mesh network that is not directly connected to the first node.

5. The computer-implemented method of any of clauses 1-4, wherein the resource parameter associated with the at least one node comprises at least one of a computational cost of encrypting the network message at the first node, an amount of time needed for the first node to encrypt the network message, an amount of memory used to encrypt the network message at the first node, an amount of power used to encrypt the network message at the first node, or an indication of an amount of power remaining at the first node.

6. The computer-implemented method of any of clauses 1-5, wherein the resource parameter associated with the at least one node comprises at least one of a number of resource-limited nodes that are directly connected to the first node or an indication of the availability of an asymmetric encryption key at the first node.

7. The computer-implemented method of any of clauses 1-6, wherein the one or more other nodes include at least a second node, and further comprising: determining from the network message that a trust level associated with the second node has changed from a first trust level to a second trust level; and in response, broadcasting a new network message to a third node included in the mesh network, wherein the new network message indicates that the second node has changed from the first trust level to the second trust level.

8. The computer-implemented method of any of clauses 1-7, wherein the second trust level comprises a higher trust level than the first trust level.

9. The computer-implemented method of any of clauses 1-8, wherein the attribute of the network message comprises at least one of a trust level associated with the network message or a forwarding status associated with the network message.

10. The computer-implemented method of any of clauses 1-9, wherein the trust level associated with the network message comprises one of a manufacturing trust level, a vendor trust level, or a customer trust level.

11. In some embodiments, a non-transitory computer-readable storage medium including instructions that, when executed by one or more processors, configure the one or more processors to perform the steps of: receiving at a first node included within a mesh network a network message that is to be broadcast within the mesh network; determining a security key type based on at least one of a resource parameter associated with at least one neighbor node included in the mesh network or an attribute of the network message; securing the network message with a security key of the security key type to generate a secured network message; and broadcasting the secured network message to one or more other nodes included in the mesh network that are directly connected to the first node.

12. The non-transitory computer-readable storage medium of clause 11, wherein the security key type is one of an asymmetric encryption key, a symmetric encryption key, an asymmetric authentication key, or a symmetric encryption key.

13. The non-transitory computer-readable storage medium of clauses 11 or 12, wherein broadcasting the secured network message to the one or more other nodes included in the mesh network comprises broadcasting the network message to a second node included in the mesh network that is not directly connected to the first node.

14. The non-transitory computer-readable storage medium of any of clauses 11-13, wherein the resource parameter associated with the at least one node comprises at least one of a computational cost of encrypting the network message at the first node, an amount of time needed for the first node to encrypt the network message, an amount of memory used to encrypt the network message at the first node, an amount of power used to encrypt the network message at the first node, or an indication of an amount of power remaining at the first node.

15. The non-transitory computer-readable storage medium of any of clauses 11-14, wherein the resource parameter associated with the at least one node comprises at least one of a number of resource-limited nodes that are directly connected to the first node or an indication of the availability of an asymmetric encryption key at the first node.

16. The non-transitory computer-readable storage medium of any of clauses 11-15, wherein the one or more other nodes include at least a second node, and further comprising instructions that, when executed by one or more processors, configure the one or more processors to perform the steps of: determining from the network message that a trust level associated with the second node has changed from a first trust level to a second trust level; and in response, broadcasting a new network message to a third node included in the mesh network, wherein the new network message indicates that the second node has changed from the first trust level to the second trust level.

17. The non-transitory computer-readable storage medium of any of clauses 11-16, wherein the second trust level comprises a higher trust level than the first trust level.

18. The non-transitory computer-readable storage medium of any of clauses 11-17, wherein the attribute of the network message comprises at least one of a trust level associated with the network message or a forwarding status associated with the network message.

19. The non-transitory computer-readable storage medium of any of clauses 11-18, wherein the trust level associated with the network message comprises one of a manufacturing trust level, a vendor trust level, or a customer trust level.

20. In some embodiments, a system comprises: a processor; and a memory storing instructions that, when executed by the processor, cause the processor to perform the steps of: receiving at a first node included within the mesh network a network message that is to be broadcast within the mesh network; determining an encryption key type based on at least one of a resource parameter associated with at least one neighbor node included in the mesh network or an attribute of the network message; encrypting the network message with an encryption key of the encryption key type to generate an encrypted network message; and broadcasting the encrypted network message to one or more other nodes included in the mesh network that are directly connected to the first node.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
receiving, by a first node of a mesh network, a message;
determining, by the first node, a security key type based on a resource parameter associated with a neighbor node included in the mesh network;
securing, by the first node, the message using a security key of the security key type; and
transmitting, by the first node, the secured message to the neighbor node;
wherein the resource parameter associated with the neighbor node comprises at least one of an amount of memory used to decrypt the secured message at the neighbor node, an amount of power used to decrypt the secured message at the neighbor node, or an indication of an amount of power remaining at the neighbor node.

2. The method of claim 1, wherein the security key is stored at the first node.

3. The method of claim 1, wherein the security key type is one of an asymmetric encryption key, a symmetric encryption key, an asymmetric authentication key, or a symmetric authentication key.

4. The method of claim 1, wherein:
determining of the security key type is further based on a resource parameter associated with the first node; and
the resource parameter associated with the first node comprises at least one of an amount of memory used to encrypt the message at the first node, an amount of power used to encrypt the message at the first node, or an indication of an amount of power remaining at the first node.

5. The method of claim 1, wherein determining of the security key type is further based on at least one of a number of resource-limited nodes that are directly connected to the first node or an indication of an availability of an asymmetric encryption key at the first node.

6. The method of claim 1, further comprising in response to determining, by the first node and from the message, that a trust level associated with the neighbor node has changed from a first trust level to a second trust level, broadcasting a second message, wherein the second message indicates that the neighbor node has changed from the first trust level to the second trust level.

7. The method of claim 6, wherein the second trust level comprises a higher trust level than the first trust level.

8. The method of claim 1, wherein determining of the security key type is further based on at least one of a trust level associated with the message or a forwarding status associated with the message.

9. The method of claim 8, wherein the trust level associated with the message comprises one of a manufacturing trust level, a vendor trust level, or a customer trust level.

10. One or more non-transitory computer-readable storage media storing program instructions that, when executed by one or more processors of a networking device, causes the one or more processors to perform operations comprising:
receiving a message to be transmitted to a second networking device, the second networking device being a neighbor to the networking device in a mesh network;
determining, based on a resource usage parameter associated with the second networking device, a type of encryption key to use to encrypt the message;
encrypting, using an encryption key of the determined type, the message; and
sending the encrypted message to the second networking device;
wherein the resource usage parameter associated with the second network device comprises at least one of an amount of memory to be used by the second networking device to decrypt the encrypted message, an amount of power to be used by the second networking device to decrypt the encrypted message, or an amount of battery power remaining at the second networking device.

11. The one or more non-transitory computer-readable storage media of claim 10, wherein the determined type is one of an asymmetric encryption key, a symmetric encryption key, an asymmetric authentication key, or a symmetric authentication key.

12. The one or more non-transitory computer-readable storage media of claim 10, wherein:
determining the type of the encryption key comprises determining the type further based on a resource usage parameter associated with the networking device; and
the resource usage parameter associated with the networking device comprises at least one of an amount of memory to be used to encrypt the message, an amount of power to be used to encrypt the message, or an amount of battery power remaining at the networking device.

13. The one or more non-transitory computer-readable storage media of claim 10, wherein determining the type of the encryption key comprises determining the type further based on at least one of a number of resource-limited networking devices that are neighbors to the networking device or whether an asymmetric encryption key is available at the networking device.

14. The one or more non-transitory computer-readable storage media of claim 10, wherein the operations further comprise in response to determining, from the message, that a level of trust associated with the second networking device has been increased from a first level of trust to a higher second level of trust, broadcasting a second message to indicate that the second network device has the higher second level of trust.

15. The one or more non-transitory computer-readable storage media of claim 10, wherein determining the type of the encryption key comprises determining the type further based on at least one of a level of trust associated with the message or a forwarding status associated with the message.

16. A node device comprising:
one or more processors; and
a memory storing instructions that, when executed by the one or more processors, causes the one or more processors to perform operations comprising:
   obtaining a networking message for transmission to a second node device, the second node device being directly connected to the node device via a wireless network connection;
   determining a type of security key for securing the network message based on one or more resource parameters associated with the second node device;
   securing the networking message using a security key of the determined type; and
   transmitting, via the wireless network connection, the secured networking message to the second node device;
wherein the one or more resource parameters associated with the second node device comprise one or more of an amount of memory to be used by the second node device to decrypt the secured networking message, an amount of power consumed by the second node device to decrypt the secured networking message, or an amount of power remaining at the second node device.

17. The node device of claim 16, wherein the type of the security key is one of an asymmetric encryption key, a symmetric encryption key, an asymmetric authentication key, or a symmetric authentication key.

18. The node device of claim 16, wherein:
determining the type of the security key comprises determining the type further based on one or more resource parameters associated with the node device; and
the one or more resource parameters associated with the node device comprises at least one of an amount of memory to be used to encrypt the network message, an amount of power to be used to encrypt the network message, or an indication of an amount of power remaining at the node device.

19. The node device of claim 16, wherein determining the type of the security key comprises determining the type further based on at least one of a number of resource-limited nodes that are connected to the node device via a respective wireless network connection or an indication of an availability of an asymmetric encryption key at the node device.

20. The node device of claim 16, wherein determining the type of the security key comprises determining the type by applying a tunable weighting algorithm to the one or more resource parameters.

* * * * *